April 15, 1947. W. C. HUEBNER Re. 22,869

PROCESS AND APPARATUS FOR ELECTRONIC PRINTING

Original Filed June 6, 1939 13 Sheets-Sheet 1

INVENTOR
William C. Huebner
By Joseph Harris
ATTORNEY

PROCESS AND APPARATUS FOR ELECTRONIC PRINTING

Original Filed June 6, 1939 13 Sheets-Sheet 2

INVENTOR
William C. Huebner
BY Joseph Harris
ATTORNEY

April 15, 1947. W. C. HUEBNER Re. 22,869

PROCESS AND APPARATUS FOR ELECTRONIC PRINTING

Original Filed June 6, 1939 13 Sheets-Sheet 3

INVENTOR
William C. Huebner
BY Joseph Harris
ATTORNEY

April 15, 1947. W. C. HUEBNER Re. 22,869

PROCESS AND APPARATUS FOR ELECTRONIC PRINTING

Original Filed June 6, 1939 13 Sheets-Sheet 4

INVENTOR
William C. Huebner
BY Joseph Harris
ATTORNEY

PROCESS AND APPARATUS FOR ELECTRONIC PRINTING

Original Filed June 6, 1939 13 Sheets-Sheet 5

INVENTOR
William C. Huebner
BY Joseph Harris
ATTORNEY

April 15, 1947. W. C. HUEBNER Re. 22,869

PROCESS AND APPARATUS FOR ELECTRONIC PRINTING

Original Filed June 6, 1939 13 Sheets-Sheet 6

INVENTOR
William C. Huebner
By Joseph Harris
ATTORNEY

April 15, 1947. W. C. HUEBNER Re. 22,869

PROCESS AND APPARATUS FOR ELECTRONIC PRINTING

Original Filed June 6, 1939 13 Sheets-Sheet 7

INVENTOR
William C. Huebner
BY Joseph Harris
ATTORNEY

PROCESS AND APPARATUS FOR ELECTRONIC PRINTING

Original Filed June 6, 1939 13 Sheets-Sheet 8

INVENTOR
William C. Huebner
BY Joseph Harris
ATTORNEY

PROCESS AND APPARATUS FOR ELECTRONIC PRINTING

Original Filed June 6, 1939 13 Sheets-Sheet 9

INVENTOR
William C. Huebner
BY Joseph Harris
ATTORNEY

PROCESS AND APPARATUS FOR ELECTRONIC PRINTING

Original Filed June 6, 1939 13 Sheets-Sheet 10

INVENTOR
William C. Huebner
By Joseph Harris
ATTORNEY

PROCESS AND APPARATUS FOR ELECTRONIC PRINTING

Original Filed June 6, 1939 13 Sheets-Sheet 11

INVENTOR
William C. Huebner
BY Joseph Harris
ATTORNEY

PROCESS AND APPARATUS FOR ELECTRONIC PRINTING

Original Filed June 6. 1939 13 Sheets-Sheet 12

INVENTOR
William C. Huebner
BY Joseph Harris
ATTORNEY

PROCESS AND APPARATUS FOR ELECTRONIC PRINTING

Original Filed June 6, 1939 13 Sheets-Sheet 13

INVENTOR
William C. Huebner
BY Joseph Harris
ATTORNEY

Reissued Apr. 15, 1947

Re. 22,869

UNITED STATES PATENT OFFICE 22,869

PROCESS AND APPARATUS FOR ELECTRONIC PRINTING

William C. Huebner, New York, N. Y.

Original No. 2,224,391, dated December 10, 1940, Serial No. 277,644, June 6, 1939. Application for reissue April 17, 1945, Serial No. 588,755

21 Claims. (Cl. 101—426)

This invention relates to improvements in process of and apparatus for electronic printing.

The primary object of the invention is to provide a printing press optionally utilizable for printing, with or without pressure, on any suitable print receiving material from any practical printing surface produced in relief, gravure, or planographic, on a plate or cylinder and which press is also adapted to carry out certain improvements in process of printing.

As appreciated by those skilled in the art, there is a definite trend at the present time toward faster and cleaner printing and toward the use of lighter weight of materials, forms and presses and an effort to eliminate or materially reduce the pressures now required in the common forms of presses for relief, intaglio and offset presses. In line with this trend is also the demand for reduction in the investment involved in the several separate kinds of presses required for the different classes of printing, and another object of this invention, therefore, is to provide in a single press, means by which any one of the classes or methods of printing, as may be found necessary or desirable for different jobs, may be carried out by simple adjustment and/or interchange of certain parts of the press and, at the same time, the press made of lighter materials and total weight than former presses limited to only one class or method of printing.

Another object of the invention is to provide a press wherein the transference of the ink from the printing surface to the print receiving material may be selectively effected either under pressure and contact between the printing surface and print receiving material; entirely without pressure or contact between the printing surface and the print receiving material by subjecting the ink to electromagnetic and/or electrostatic lines of force, as hereinafter described; or by contact, but without appreciable pressure between the printing surface and print receiving material.

A further object is to provide an improvement in the method of printing wherein the ink is applied to the image areas only of the printing surface, whether of relief, intaglio or planographic character, by electromagnetic and/or electrostatic lines of force and the ink from the printing surface thereafter transferred to the print receiving material either with or without pressure and either directly or indirectly by offset.

Still another object of the invention is to provide a printing press wherein all of the foregoing stated objects of invention may be carried out equally effectively either in a single color or multicolor press.

Other objects of the invention will more clearly appear from the description and claims hereinafter following.

In the drawings forming a part of this specification,

Figures 6, 7, 8 and 9 are vertical sectional views corresponding respectively to Figures 1, 2, 3 and 4, but illustrating the improved press as adapted to print entirely without contact or pressure or by contact with the print receiving material but with merely slight pressure, the press as shown in said figures being arranged to effect the transference of the ink from the ink-image-carrying cylinder to the surface of the print receiving web of material by lines of force in an electromagnetically and-or electrostatically induced field of force.

Figure 1:
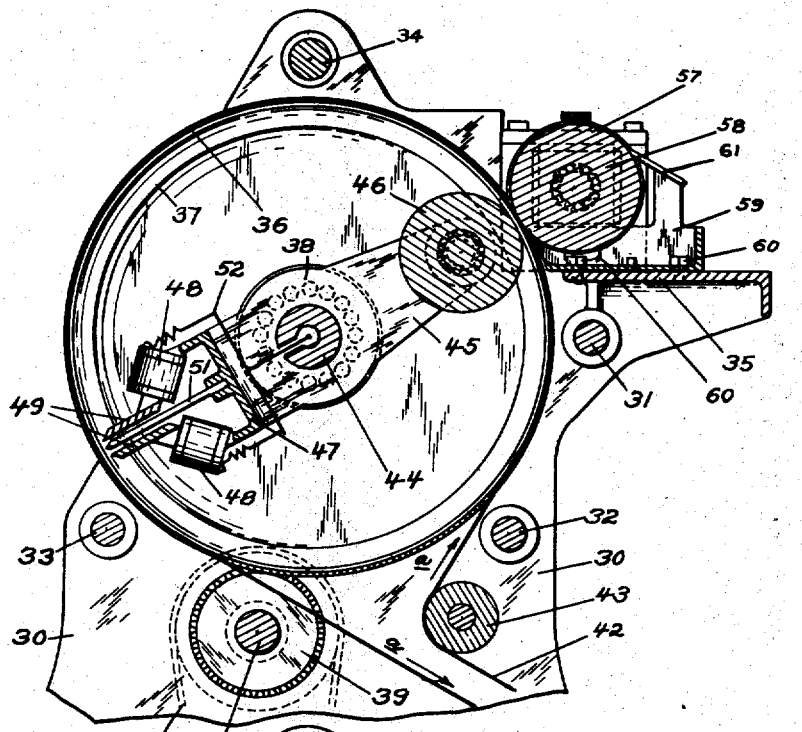
Figure 1 is a vertical sectional view of a single color printing press embodying the invention and illustrating the same for printing from a gravure cylinder directly to the web of print receiving material under pressure. In this and all subsequent figures, the drawings are more or less diagrammatic with omission of details inessential to an understanding of the invention.
Figure 2:
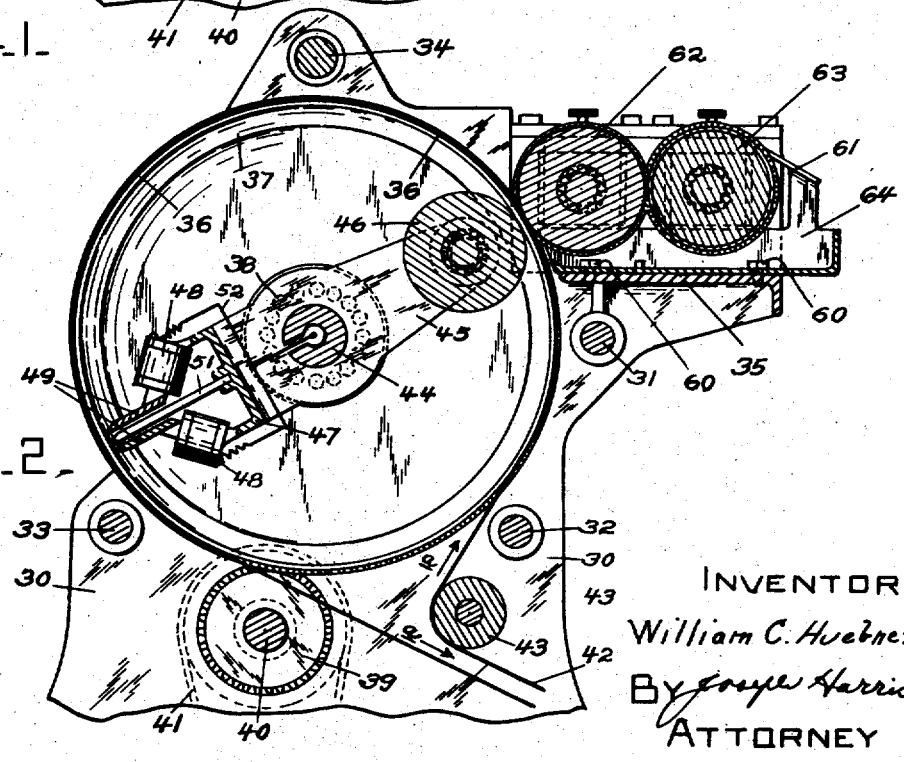
Figure 2 is a view similar to Figure 1, illustrating a press embodying the invention adapted to print from a gravure cylinder through the intermediary of an offset cylinder utilizing pressure.
Figure 10:
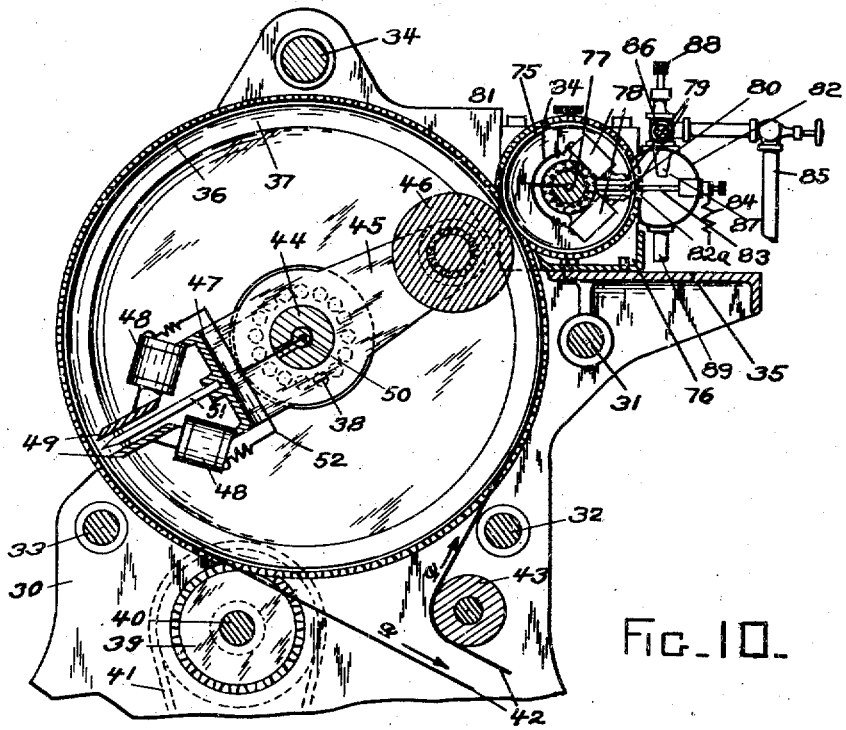
Figure 11:
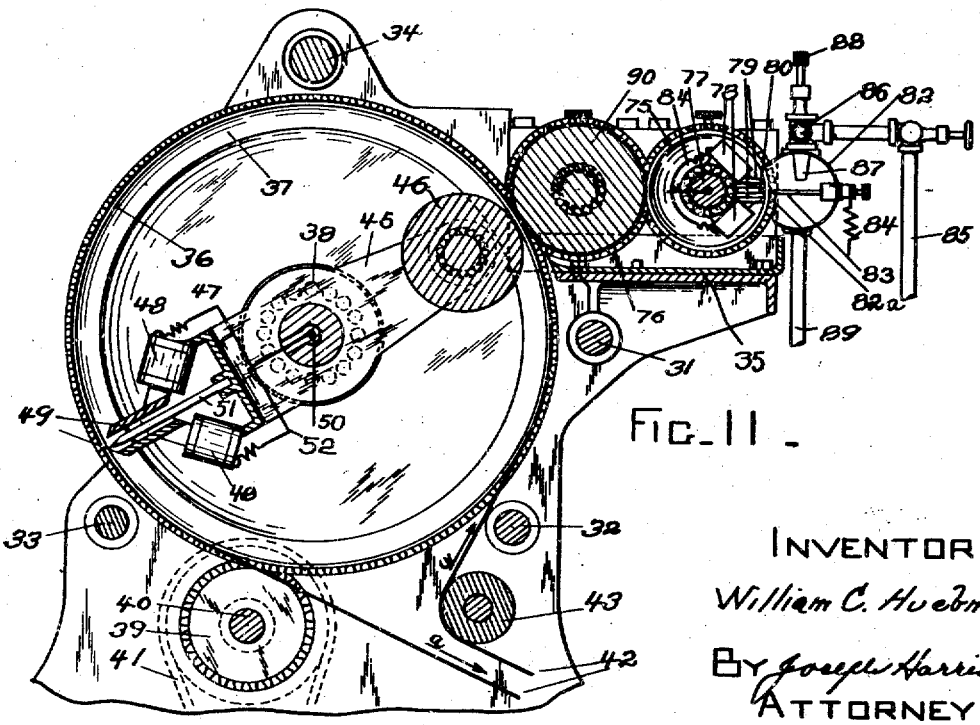

Figures 10 and 11 are views similar to Figures 1 and 2, but showing the press arranged to apply the ink to the image areas of the image carrying drum or cylinder by means of lines of force induced electromagnetically and/or electrostatically, and wherein pressure is employed in the zone of transfer of the ink to the web of print receiving material on the drum.

Figure 12:
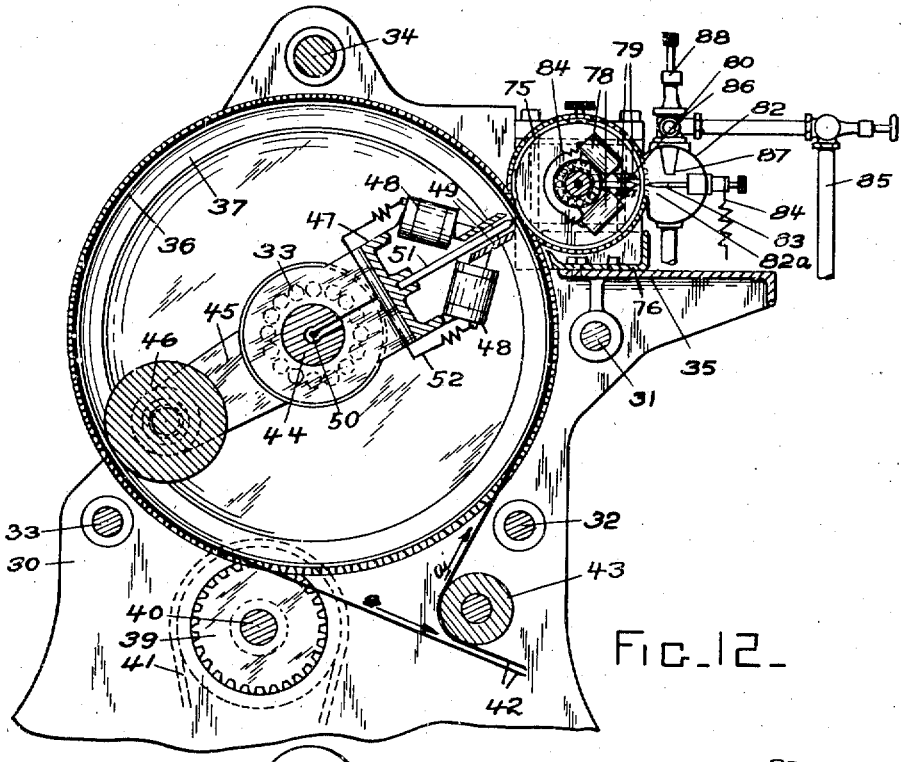
Figure 13:
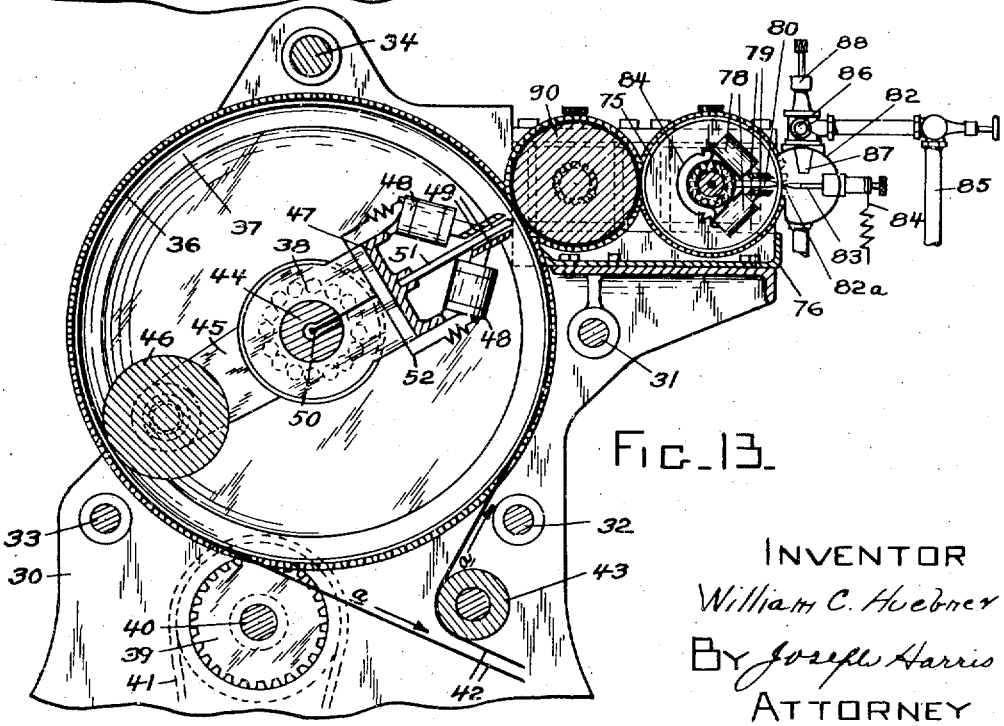

Figures 12 and 13 are views similar to Figures 10 and 11, but showing the press arranged to effect transference of the ink from the inked image of the image-carrying cylinder adjacent the impression drum to the web of print receiving material by induced lines of force.

Figure 14:
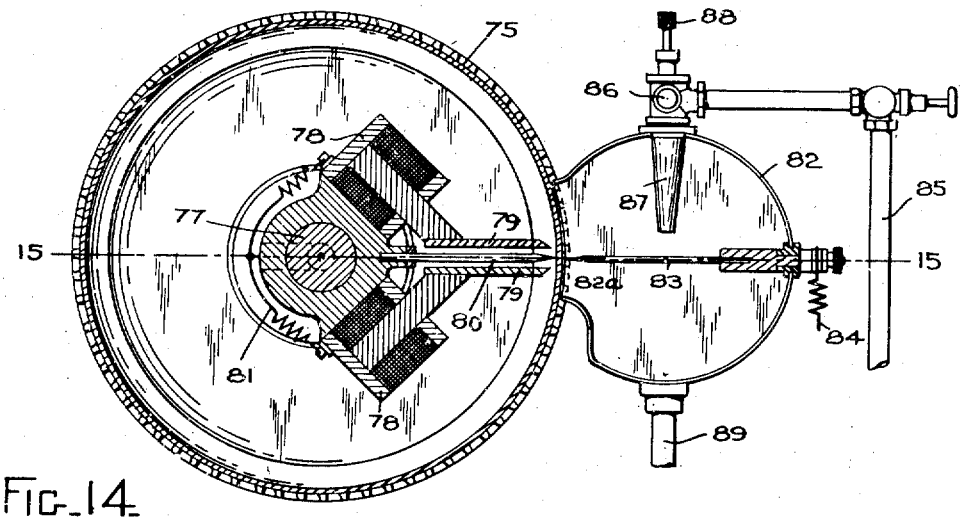

Figure 14 is a vertical sectional view, upon an enlarged scale, illustrating more specifically the improved device for applying ink to the image areas of the image carrying cylinder or drum.

Figure 15:
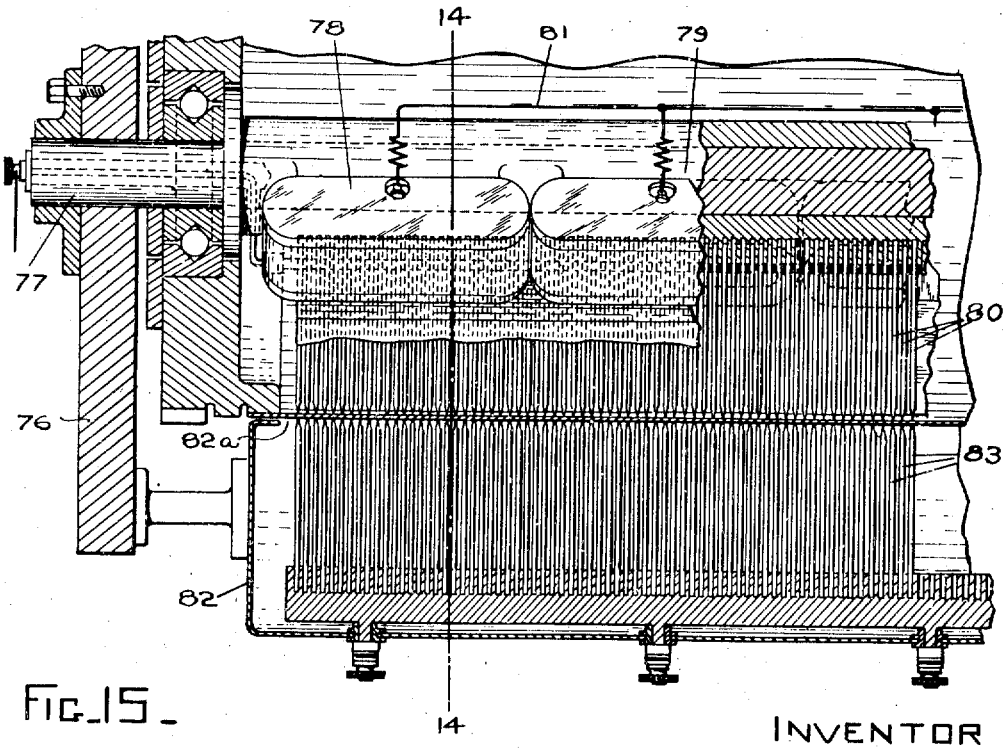

Figure 15 is a horizontal sectional view, corresponding to the section line 15—15 of Figure 14.

Figure 16:
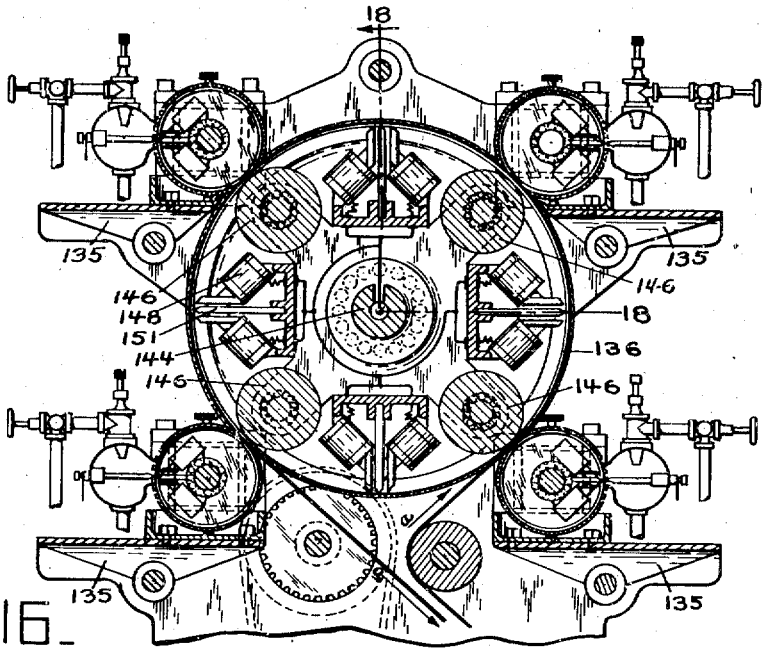
Figure 17:
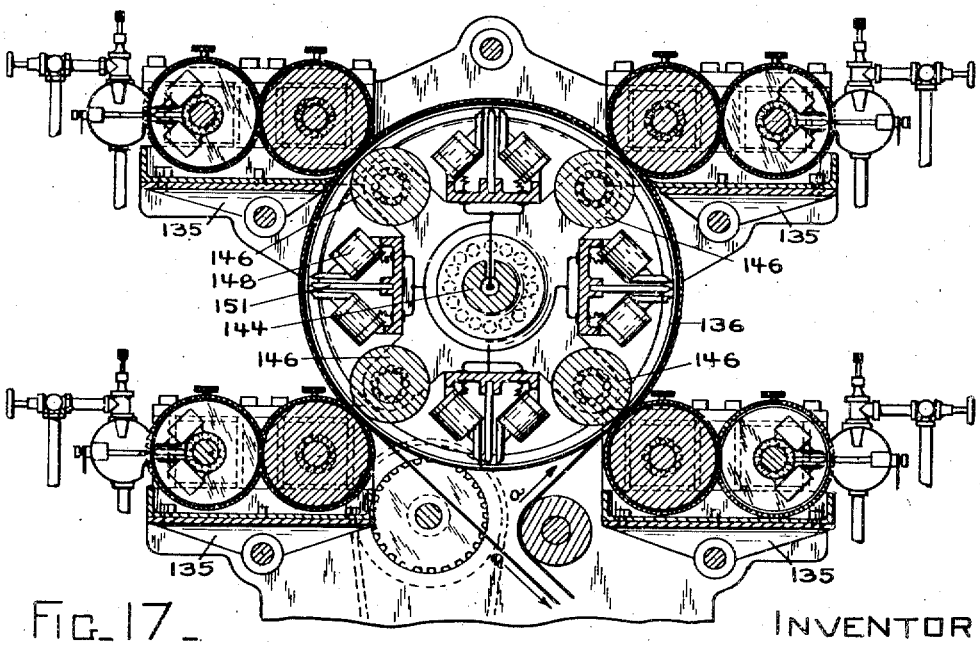

Figures 16 and 17 are vertical sectional views of a multicolor press embodying the invention and showing the press adapted to print at each station in a manner similar to those shown respectively in Figures 10 and 11 of the single color press.

Figure 18:
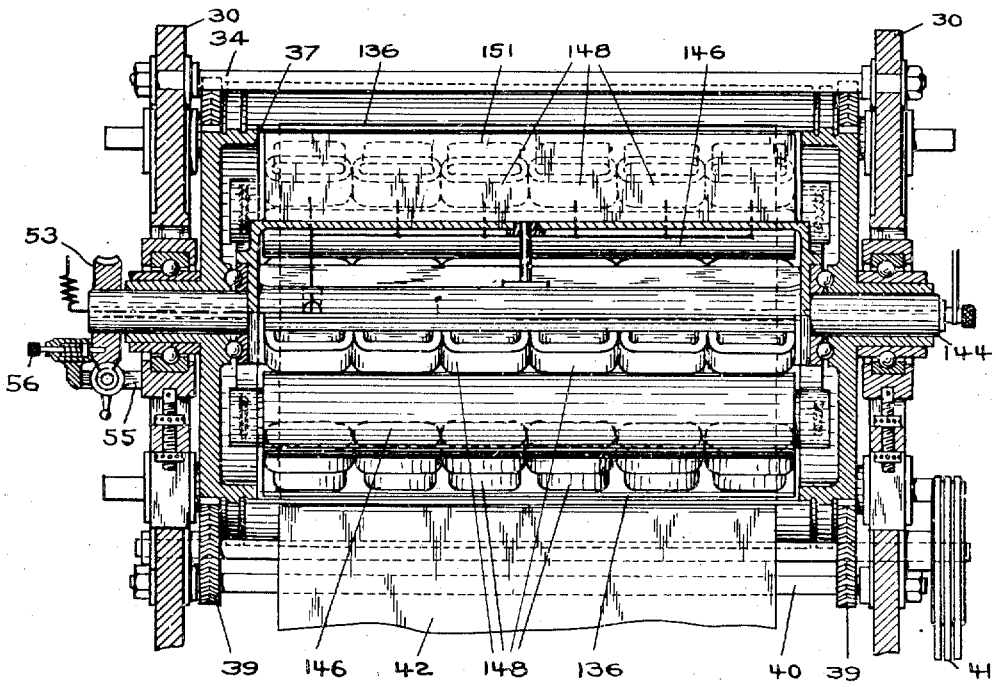
Figure 19:
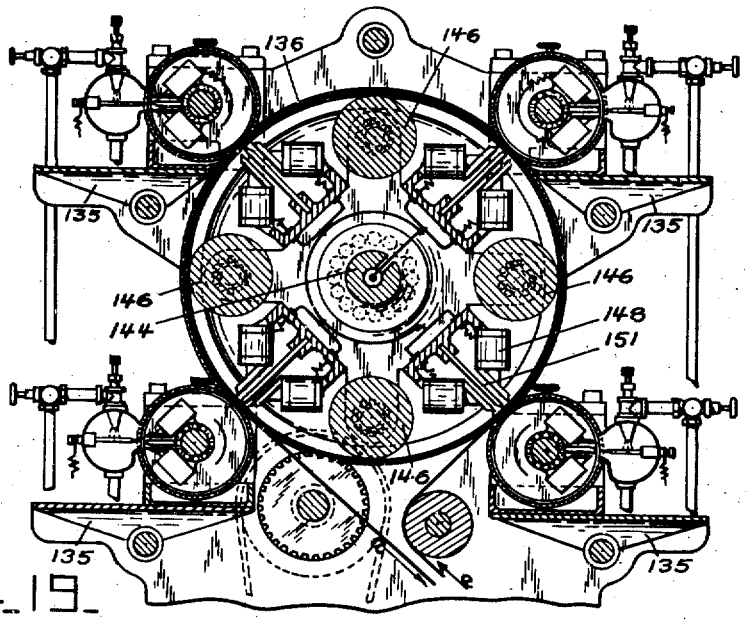
Figure 20:
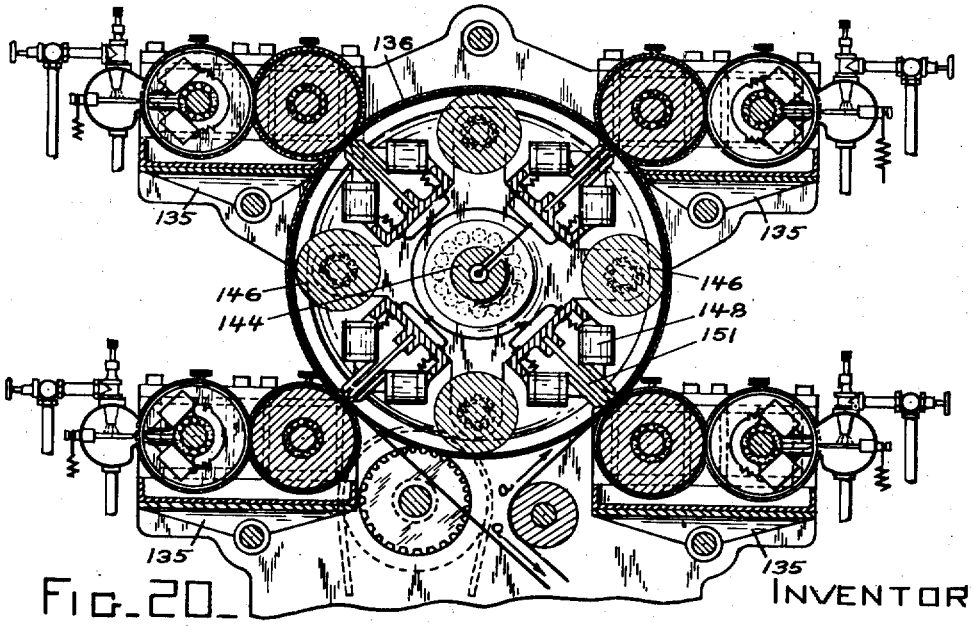

Figure 18 is a longitudinal sectional view of the press shown in Figure 16, corresponding to the line 18—18 thereof, and Figures 19 and 20 are vertical sectional views of a multicolor press showing the same adapted to print in the same manner as illustrated in the single color presses of Figures 12 and 13, respectively.

Figure 3:
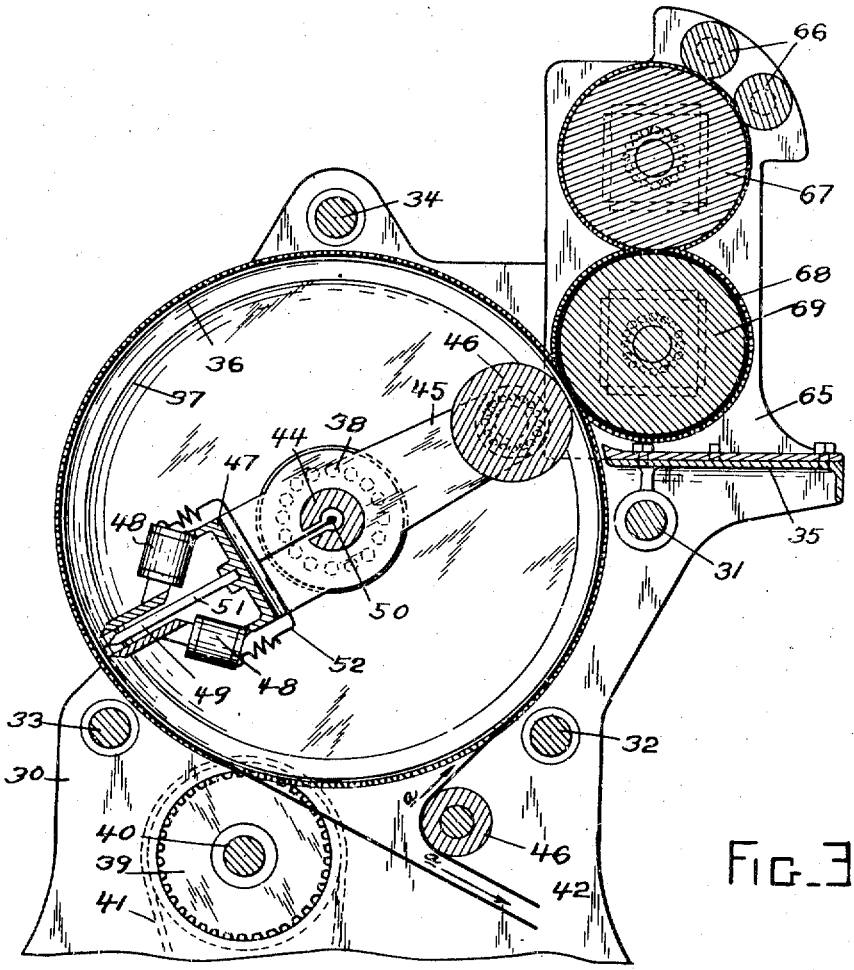
Figure 3 is a similar vertical sectional view illustrating the invention as adapted to printing under pressure from a relief plate.
Figure 4:
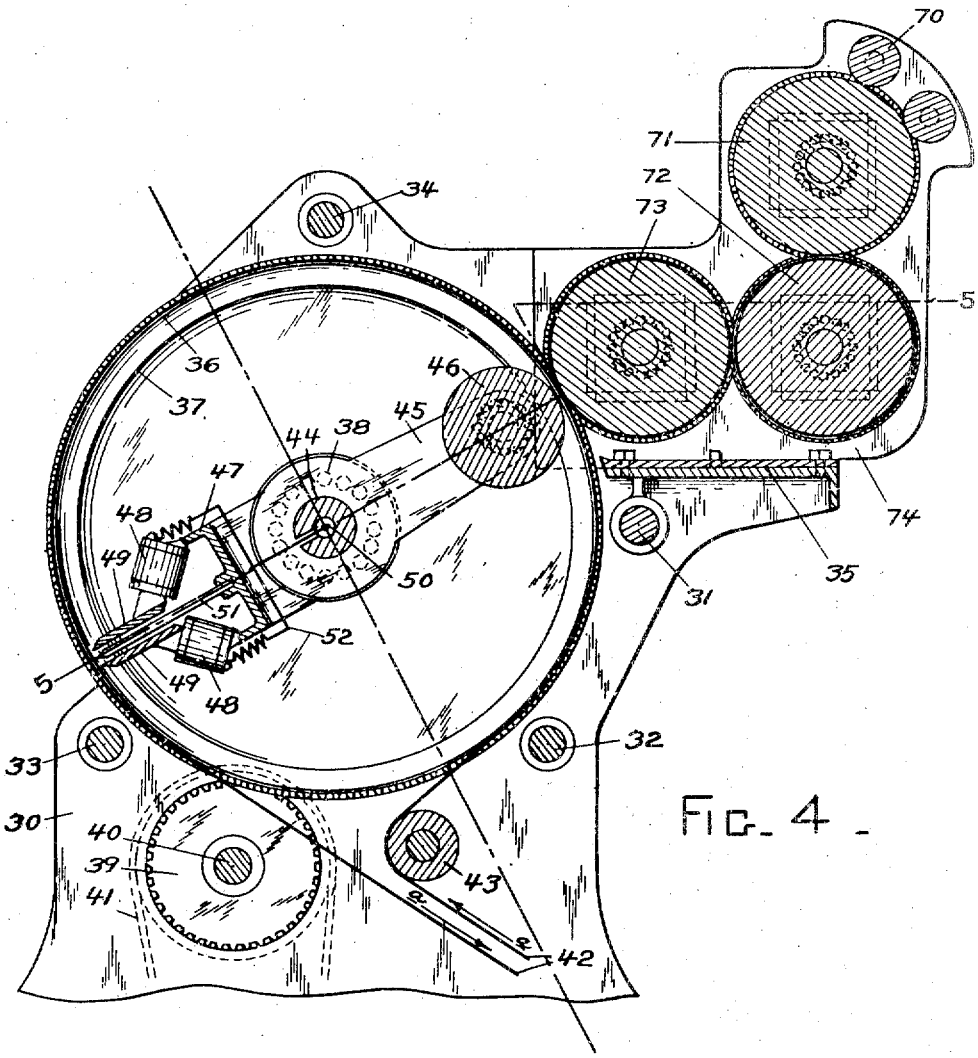
Figure 4 is a similar vertical sectional view of a press showing the same arranged for printing under pressure from a cylinder having either a planographic or relief printing surface through the intermediary of an offset cylinder.
Figure 5:
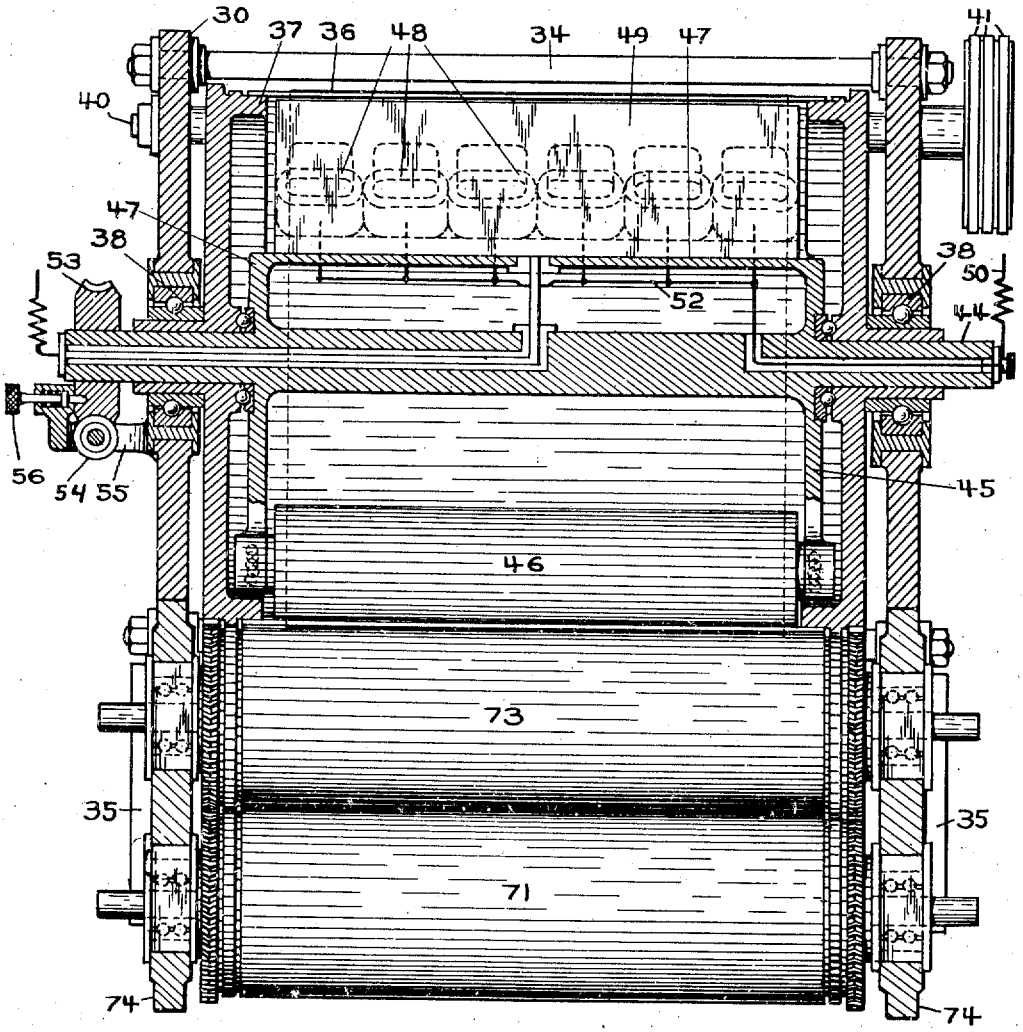
Figure 5 is a longitudinal sectional view of the press shown in the preceding figures and corresponding to the section line 5—5 of Figure 4 and upon a somewhat enlarged scale.

Referring first to the press as illustrated in Figures 1 to 5 inclusive, the same comprises a suitable frame, only such portions thereof being illustrated as necessary to illustrate the invention. Said frame includes side upright standards 30—30, suitably connected by a plurality of cross braces 31, 32, 33 and 34. The frame is also provided with a horizontal ledge or shelf 35 on which the several inking and image carrying rolls and cylinders are adapted to be interchangeably mounted, as hereinafter described. Mounted between the standards 30 is a hollow, light sheet metal impression drum 36, having end walls 37—37, said drum being suitably journaled in ball bearings 38—38, as best shown in Figure 5. The drum 36 is geared in the usual manner to a driving gear 39 mounted on a shaft 40, said gear 39 being adapted to be driven from any suitable source, as indicated conventionally by the drive belt 41. The web 42 of print receiving material which may be of paper, textile, certain metals or any other material that can be run through the press under control, is adapted to be fed from suitable feed mechanism, not shown, over an idler 43, thence around the drum 36, as indicated by the arrow *a*, and thence to a take-up mechanism not deemed necessary to be illustrated.

Disposed within the drum 36 and journaled within the hubs of the latter is a shaft 44 having preferably integrally formed therewith a pair of radially extending arms 45—45, in the ends of which is journaled in ball bearings, the pressure roller 46, the latter being so positioned that it firmly engages the interior surface of the impression drum 36. The shaft 44 is also preferably provided with an integral, longitudinally extending heavy arm 47, diametrically disposed with reference to the arms 45, which arm 47 carries the electromagnetic and electrostatic devices. Said last named devices preferably are constructed as follows: Mounted on the arm 47 are two series of electromagnets 48—48, the series being arranged longitudinally or parallel to the axis of the shaft 44, each series of magnets having the armatures thereof united to a common pick-up-armature plate 49, the latter being somewhat spaced and having their outer beveled edges terminating a short distance from the interior of the surface of the drum 36, as illustrated in the drawings. Current to the two series of magnets 48 may be supplied in any suitable manner, as through the wire 50 entered axially through one end of the shaft 44, as illustrated in Figure 5 and connected to the magnets as shown.

Also carried by the arm 47 is an electrostatic member preferably in the form of an elongated plate 51 which may have a very fine saw tooth edge and disposed between the magnetic plates 49—49 and slightly spaced from the latter, the edge of the plate 51 also terminating slightly spaced from the interior surface of the drum 36, as shown in the drawings. The electrostatic potential for the plate 51 may be supplied to the latter in any suitable manner as through the conductor 52 entered through the opposite end of the shaft 44, as shown in Figure 5. As will be understood, the conductor 52 will be connected to a suitable source of static electricity generating apparatus, not deemed essential to be illustrated. As will be apparent from the preceding description, a concentrated field of force consisting of either electromagnetically induced lines of force or electrostatically induced lines of force or a combination of both will be induced at the surface of the drum immediately opposite the edges of the magnetic plates 49 and plate 51 whenever the necessary potentials are supplied, it being further understood that the magnets and electrostatic arrangements will be such that the lines of force will all be directed radially inwardly of the drum 36, for the purpose hereinafter described.

The shaft 44 carrying the pressure roller 46 and fields of force inducing means is angularly adjustable within the drum 36 by any suitable means such as by a worm gear 53 secured to the end of the shaft 44, worm 54, cooperable therewith, the latter being mounted on a suitable bracket 55 attached to the adjacent standard 30. The shaft and parts carried thereby may be held in definite adjusted positions as by the spring controlled latch 56 engageable with the worm gear 53.

In the condition of the press shown in Figures 1, 2, 3 and 4, the pressure roller 46 is positioned in what may be termed the "impression zone" of the drum, that is, in the zone or at the point where the ink is transferred from the image-carrying or offset cylinder directly to the web 42. As so positioned, it is evident that the pressure roller 46 will afford the necessary support or backing for the drum 36 to permit of the ink transference to the web under pressure, and to such a degree of pressure as may be found advisable by adjusting the ink-image-carrying cylinder, whether direct or offset, that is placed in cooperation with the drum for printing.

To provide for universality of printing methods utilizing pressure during transference of the ink to the web of print receiving material, the various printing cylinder setups are made detachably and interchangeably mountable upon the shelf 35. In Figure 1, the press is shown as arranged for gravure printing direct from the gravure cylinder 57. Said cylinder is suitably rotatably mounted in bearing blocks 58 adjustable in a sub-frame 59, adapted to be detachably secured to the shelf 35 and adjustable horizontally thereon by any suitable means such as the securing bolts 60—60. In said arrangement, the usual doctor blade 61 is shown and obviously the impression is made direct from the cylinder 57 to the web 42 under pressure. The usual inking rolls are omitted as not being essential to an understanding of the invention.

In Figure 2, the arrangement is similar to that shown in Figure 1, except that an offset or blanket cylinder 62 is interposed between the impression drum and the gravure cylinder 63, thus permitting of what may be termed dry gravure offset printing. The cylinders 62 and 63 are mounted in a sub-frame 64 detachably mounted on the shelf 35 and said cylinders are geared together and the offset cylinder 62 in turn geared to the drum.

In Figure 3, the press is shown arranged for relief plate printing. As there shown, the sub-frame 65 has mounted therein and shown conventionally, inking rollers 66 which initially apply ink to a preferably hard surface inking cylinder 67 from which the ink is transferred to the relief surface of a plate 68 mounted on relief cylinder 69, it being understood that the cylinders 67 and 69 are geared, and the cylinder 69 in turn geared to the drum. In this use of the invention, the relief printing plate will preferably be provided with a resilient underlay in the form of a continuous rubber backing sheet for the relief proper to thereby reduce the time of make-ready and insure more uniform and sharper impressions.

In Figure 4, the press is shown arranged for offset printing from either a planographic or relief image cylinder. As there shown, inking rollers 70—70 are adapted to apply the ink initially to a preferably hard surface inking cylinder 71, and the latter in turn to the image-carrying cylinder 72. The latter may be provided with a press plate having either a planographic or a relief surface from which the ink is in turn transferred to the offset cylinder 73, the latter in turn transferring the ink image to the web 42. All of the cylinders 71, 72 and 73 are suitably mounted in a sub-frame 74 detachably and adjustably mounted on the shelf 35, and are all geared together and the cylinder 73 in turn geared with the drum 36. When using a planographic cylinder 72, the non-image areas of the offset cylinder 73 will be kept clear or free from ink preferably as described in my prior Patent 2,065,136, granted December 22, 1936.

Figure 6:
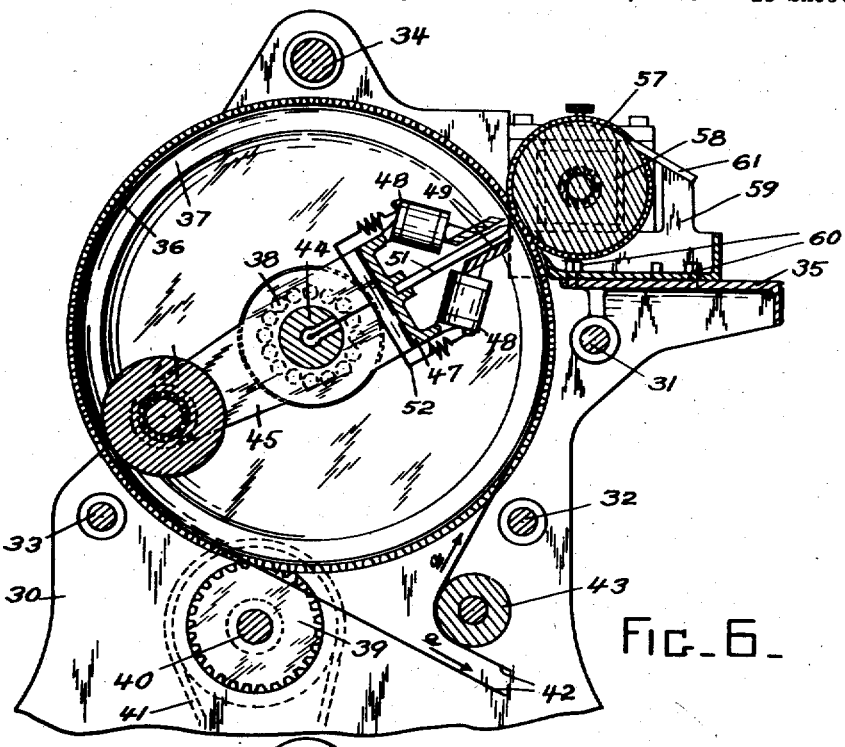
Figure 7:
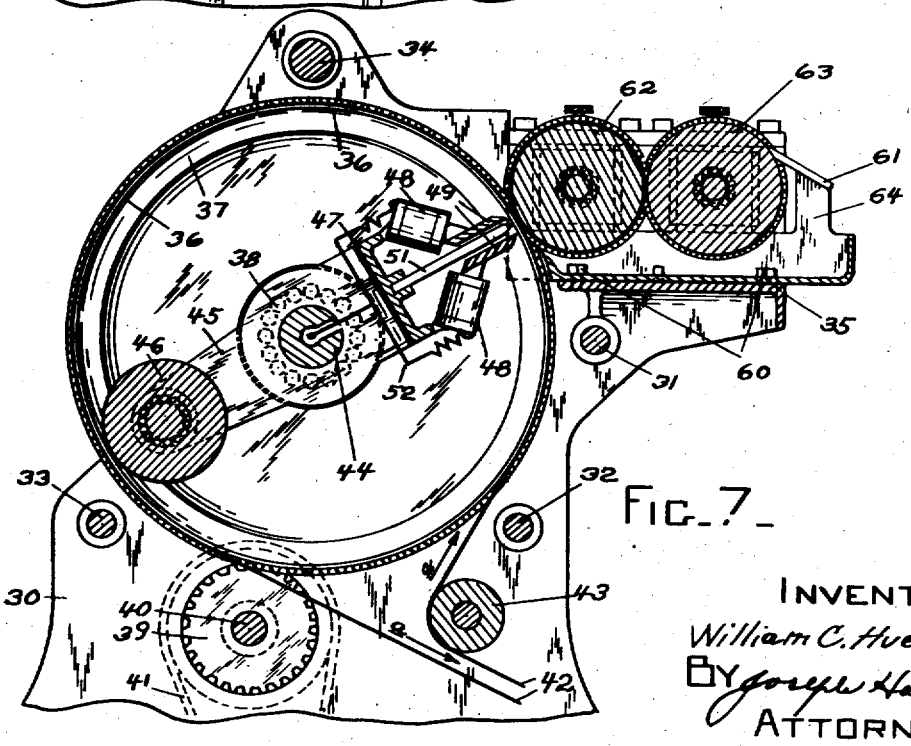
Figure 8:
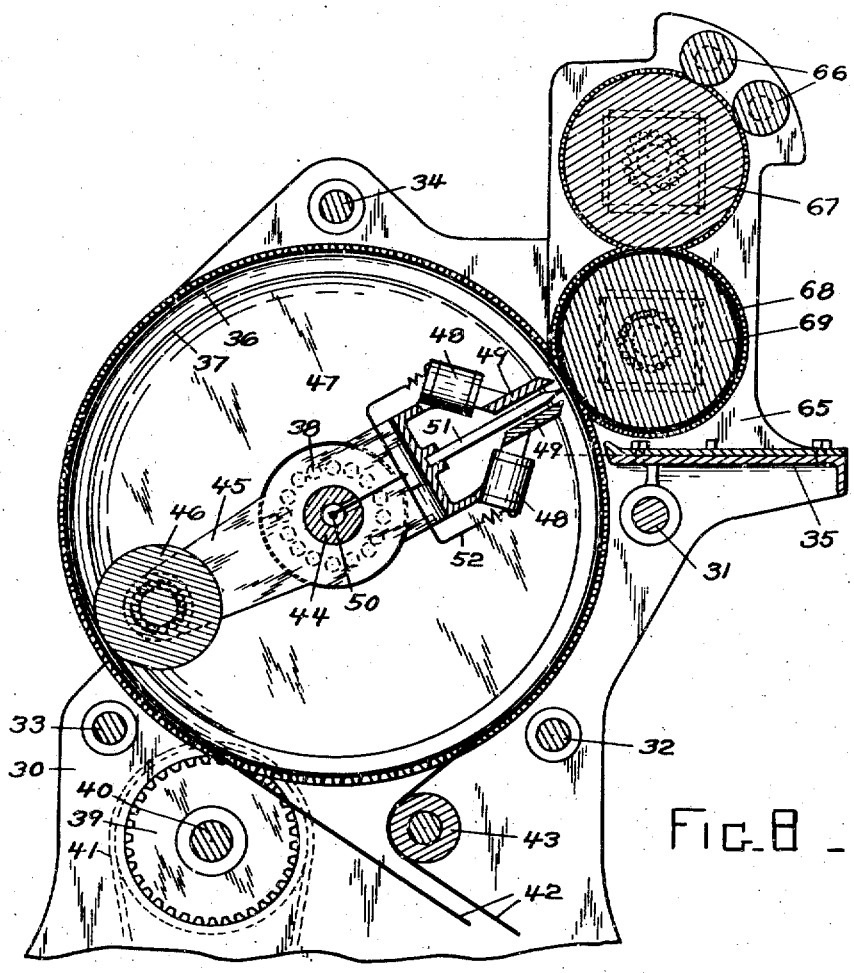
Figure 9:
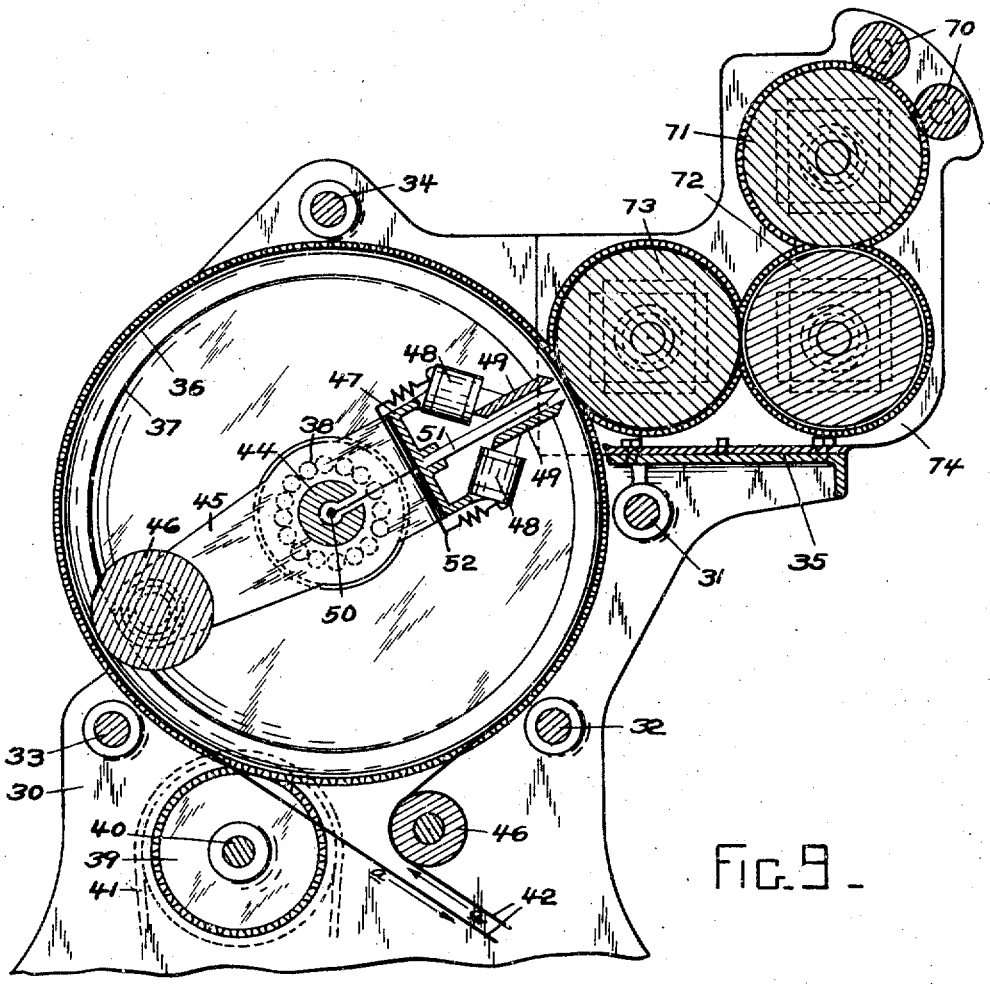

Referring next to the press as shown in Figures 6, 7, 8 and 9, the gravure cylinder of Figure 6, the gravure and offset cylinders of Figure 7, the inking and relief plate cylinders of Figure 8 and the inking, relief plate and offset cylinders of Figure 9 are the same as those shown in Figures 1, 2, 3 and 4, respectively. In Figures 6, 7, 8 and 9, however, the ink is removed or transferred from the final or ink-image-carrying cylinder of each of the setups to the web 42 by induced lines of force. This is accomplished merely by turning the shaft 44 within the drum 36 through an arc of 180° by the adjusting mechanism 53 to 56 heretofore described, so as to bring the induced field of force at the impression zone and supplying the necessary electrical energy for the magnets and electrostatic comb. In these arrangements of the press, the pressure roller 46 functions merely as an idler. The ink image-carrying cylinders, the gravure cylinder 57 of Figure 6, the offset cylinder 62 of Figure 7, the relief plate cylinder 69 of Figure 8 and the offset cylinder 73 of Figure 9, may or may not have their surfaces in contact with the web of print receiving material 42. In Figure 6, there is shown a slight spacing between the gravure cylinder 57 and the web and a similar spacing between the relief plate cylinder 69 of Figure 8, whereas in Figures 7 and 9, the printing surfaces of the offset cylinders 62 and 73 are shown merely in contact but not under material pressure with the web. As will be understood by those skilled in the art, the degree of spacing or degree of contact may be regulated and adjusted to suit varying conditions, but in any event where actual spacing is employed, it will be understood that the space will be extremely small, say three, four or five thousandths of an inch where very sharply defined reproductions of the images are desired. In certain classes of printing, where a lesser degree of definition of the reproduced image or representation is desirable or permissible, a so-called softening of the printed subject may be obtained by slightly increasing the gap or spacing between the printing surface and the print receiving material because, as will be apparent, as the spacing is increased, there is a somewhat greater opportunity for the ink to be slightly spread as it is attracted from the ink carrying surface to the ink receiving material. There is thus afforded opportunity for a wide range in the quality and characteristics of the final impressions.

Certain inks, as will be understood, may not carry any metallic substances that are subject to the influence of magnetic lines of force and hence would not be attracted by such lines of force, in which event the electrostatically induced lines of force would be employed in effecting transference of the ink. In other instances, the ink may carry metallic substances which are subject to magnetic lines of force, in which event the electromagnetically induced field would be employed to effect transference of the ink to the web. In still other instances, a combination of both the electromagnetically and the electrostatically induced fields of lines of force will be found preferable and more effective.

As defined in all dictionaries, the term "printing" involves the use of pressure between the ink-carrying and ink-receiving surfaces of a printing couple and there appears to be no available term in the English language which will accurately define the method of transferring ink from the ink-carrying to the ink-receiving surfaces of a couple where no contact or pressure is actually employed such as in the press arrangements shown in Figures 6, 7, 8 and 9. Hence, throughout the present specification where the term "printing," "impression" and related terms are employed in describing and claiming the apparatus and process, it is to be understood that in using such terms, they are used as the nearest appropriate terms and with the further understanding that such terms may or may not contemplate pressure and/or contact between the ink-carrying and ink-receiving surfaces or materials.

Further, throughout the specification, the expression "field of force," is used in that sense generally employed in writings on electrical and magnetic phenomenon to indicate the field, zone or sphere within which electrostatic or electromagnetic forces are sufficiently active or powerful enough to effect a transference of ink from one surface to another in the manner indicated in the preceding part of the description. The expression "lines of force" is likewise employed to indicate the forces themselves acting in a definite path or direction in effecting the transference of the ink. Such lines of forces are measurable in direction and amount and their effects, even though the theoretical explanation of what produces these effects may not be entirely clear or certain. Where the expression "field of force" and related expressions are employed in the claims and elsewhere, unless otherwise specifically qualified, it will be understood that such expressions are intended to refer generally either to an electrostatic field or to a magnetic field or to a combination of both and independent of any particular means by which such induced fields are created.

Referring next to Figures 10 and 11, the improved press is there shown arranged to function in the same manner as shown and heretofore described in connection with Figures 1 and 2 insofar as the taking of the actual impressions on the web is concerned, that is, utilizing pressure by disposing the pressure roller 46 at the impression zone. In these Figures 10 and 11, however, an improved means and method are employed in applying the ink to the original image-carrying member. Such improved method and means employ the induced fields of force principle heretofore described in connection with the transference of the ink from the ink image-carrying cylinder to the web. Referring specifically to Figures 10, 14 and 15, an image-carrying hollow drum or cylinder 75 is rotatably mounted in a sub-frame 76 adjustably secured to the shelf 35 of the press. Within said drum is disposed a fixed shaft 77, the latter in turn having secured thereto two sets of electromagnets 78, 78, with longitudinally extending armature plates 79, 79, similar to the magnets and armature plates 48 and 49 previously described. The shaft 77 also carries a high potential electrostatic comb 50 arranged similarly between the armature plates 79 as the previously described plate 51. The energy is supplied to the magnets and comb through suitable conductors such as indicated conventionally at 81. The points of the comb teeth and beveled edges of the armature plates 79 are brought closely adjacent to the interior surface of the drum or shell 75 and function to attract ink radially inwardly of the drum at the zone of ink application.

The ink supplying arrangement preferably consists of a casing or hood 82 of generally cylindrical form with the axis thereof parallel to the axis of the shaft 77 and disposed closely adjacent the drum 75 with an open mouth 82*a* embracing a comparatively narrow strip lengthwise of the drum 75. Within the casing 82 and extending lengthwise thereof for the length of the working area of the drum 75, is an electrostatic comb 83, the points of the teeth of which are terminated closely adjacent to the outer surface of the drum 75. Said comb 83 is preferably placed in circuit with the comb 80 as indicated conventionally by the conductor 84 and with the lines of force induced thereby such as to flow toward the center of the drum 75. Ink is supplied, preferably under pressure, from any suitable tank or the like through the pipe 85 and ultimately to a longitudinally extending manifold 86 from which depend, to the interior of the casing 82, a longitudinally arranged series of spray nozzles 87. The rate of flow through the nozzles 87 may be regulated by suitable means such as the adjustable valve indicated at 88. Any surplus ink may be drained through the outlet pipe 89.

As the ink is dropped or sprayed onto the finely spaced teeth of the comb 83, it is gradually propelled by the lines of force of the induced field of force to the tips or points of the comb teeth and transferred under the influence of said lines of force to the printing surface or image area or areas of the drum 75. In the Figure 10 arrangement, said drum 75 will preferably be provided with a gravure printing surface. In order that the ink will be transferred by the lines of force only to the image areas of the printing drum and not to the non-image areas thereof, said drum will be constructed to have the image areas thereof readily premeable to the lines of force and the non-image areas thereof impermeable or substantially impermeable to said lines of force. As illustrative of one way of accomplishing this the gravure plate on the drum may be made up of two different metals, as, for instance, a steel plate carrying a photographic design or image made by well known photo composing methods and then, after the plate is developed, a non-magnetic surface metal may be electrolytically deposited around the design or image. In other words it is contemplated to provide a printing surface which is ink-receptive as to the design or image area as regards the effect of lines of force and a non-image or design area which for the purpose of ink transfer is not subject or responsive to the lines of force of the magnetic or the induced field.

In Figure 11, the arrangement is similar to that just described in connection with Figure 10, except that an offset cylinder 90 is interposed between the image-carrying drum and the impression cylinder.

In Figures 12 and 13, the press is shown with inking and image carrying and transferring arrangements corresponding, respectively, with those shown in Figures 10 and 11, but with the impression from the final image ink carrying cylinder to the web being effected without pressure and by means of the induced field of force at the impression zone. This arrangement is of course produced by shifting the parts within the drum 36 so as to bring the magnets 48 and electrostatic plate 51 to the position there shown and as described in connection with previous figures such as 6 and 7.

Referring next to Figures 16 and 18. In the embodiment of the invention there shown, the press is of the multicolor type wherein a hollow drum 136 is employed similar to the drum of the previously described single color press arrangement. In the Figure 16 modification, however, the frame of the machine is shown as provided with four shelves or ledges 135, 135, ranged around the drum in spaced relation for four color work. Any one of the inking, image-carrying and/or offset cylinder arrangements of the kind shown in Figures 1, 2, 3, 4, 10, 11, 12 and 13 may obviously be utilized at the four impression stations around the drum, those illustrated in Figure 16 being similar to that illustrated and described in connection with Figure 10 and of which a detailed description is not deemed necessary to repeat.

Within the drum 136 is employed the same concept as heretofore described in connection with the single color press, but with the necessary duplication of pressure rollers 146 and electromagnets 148 and electrostatic plates 151 to correspond with the number of colors to be printed. All of said rollers 146, magnets 148 and plates 151 are uniformly spaced and alternated as shown and carried on the shaft 144 which is angularly adjustable in the same manner as the shaft 44 previously described. In the condition of the press shown in Figure 16, the pressure rollers 146 are positioned at the respective impression zones so that the impressions are made under pressure, as will be understood.

In Figure 17, the press is arranged similarly to that shown in Figure 16, but with the inking devices, image-carrying and offset cylinders similar to those shown in Figure 11 and of which it is unnecessary to repeat a detailed description.

Figures 19 and 20 show the press with inking devices, image carrying and offset cylinders similar to those shown respectively in Figures 16 and 17. In Figures 19 and 20, however, the shaft 144 is shown turned through an arc of 45° so as to bring the magnetic and electrostatic devices each into the respective impression zone corresponding to the image-carrying cylinders, whereby the transference of the ink at the several stations to the web of print receiving material is obtained without pressure and without contact or with contact, but without appreciable pressure in the manner hereinbefore described.

As will be understood by those skilled in the art, the terms "image" and "representation" and related terms, as used throughout the specification contemplate words, letters, delineations, drawings, pictures, illustrations and the like which may be reproduced on the print receiving material, and such terms are used as embracing any one or any combination of such items.

As will be apparent to those skilled in the art, from the preceding description, the improved press is what may be termed a universal press, since by simple adjustment and/or interchange of certain parts, all known methods of printing may be employed, and that particular method for any specific job utilized which is the most advantageous. Furthermore, the improved press eliminates or at least minimizes the disadvantages of the three most common methods of printing, relief, gravure or intaglio, and offset. As is well known, in the relief method of printing, the more serious disadvantages are the make-ready time on account of the different designs which go to make up the forms, the multiplicity of ink rollers and their cost of maintenance and replacement and the difficulty of inking forms properly without spreading ink over edges of the type or half tone dots or lines. With the improved press, these disadvantages may be substantially eliminated by adjusting the machine so as to avoid the use of pressure or substantial pressure where that is found desirable and/or by utilizing thin metal relief shells each having independent flexible and compressible backings and all mounted on a press plate. In connection with gravure or intaglio, it has heretofore been a practical necessity to print on smooth surface paper only under tremendous pressure in order to lift the ink from the pockets of the image-carrying cylinder. With the improved press, any suitable material may be employed, including rough surface paper or textile, while still utilizing gravure or intaglio printing surfaces and the pressure either eliminated or reduced to a minimum by suitable adjustment of the press. In the case of offset, one of the serious disadvantages heretofore has been the necessity of dampening the surface of the plate or cylinder with water in the white or clear areas of the printing surface, which frequently results in causing an emulsion of the water and ink, with consequent reduction in the brilliancy of the impressions obtained. With the improved press, and more particularly in connection with the improved method of applying the ink, the use of water may be eliminated in many instances. As will also be evident to those skilled in the art, the improved press may be made very light in construction, and the cost greatly reduced as compared to the investment now necessary where the several kinds of printing are carried out on different types of presses, one for each method. Other advantages will be obvious to those skilled in the art.

As will be understood, the various image carrying, ink-image carrying and transfer or offset cylinders and the impression drum are all geared so as to insure uniform surface speeds as customary. In the multicolor modifications of the press, where pressure is employed, instantaneous drying inks will preferably be employed, although special methods may be utilized for congealing the surface of the ink impressions between the different zones of impression, should this be found desirable.

Although there has herein been shown and described what is now considered the preferred manner of carrying out the invention, the same is merely illustrative and all changes and modifications are contemplated that come within the scope of the claims appended hereto.

What is claimed is:

1. In a printing press having a frame and means for feeding a web of print receiving material, the combination of a hollow impression drum rotatably mounted in the frame; an ink-image-carrying cylinder rotatably mounted on the frame and cooperable with the drum; pressure-creating means within and cooperable with the drum; means within the drum for inducing a field of force at the surface of the drum; and means for selectively positioning either said pressure creating means or the field of force creating means in operative position at the impression zone of the drum and ink-image-carrying cylinder.

2. In a printing press having a frame and means for feeding a web of print receiving material, the combination of a hollow impression drum rotatably mounted in the frame; a plurality of interchangeable different character printing units; means for interchangeably attaching any one of said printing units to said frame in cooperable juxtaposed relation to said drum; and means within the drum for effecting transfer of ink images from the ink-image-carrying element of a unit to said web of material at the impression zone of the drum and unit, whereby the press may be adapted for different types of printing.

3. In a printing press having a frame and means for feeding a web of print receiving material, the combination of a hollow impression drum rotatably mounted in the frame; an ink-image-carrying cylinder rotatably mounted in the frame in position to cooperate with the drum; a pressure roller within the drum and cooperable therewith; means within the drum for creating a field of force at the surface of the drum; and supporting means on which said pressure roller and field of force creating means are mounted, the support being angularly adjustable to thereby selectively position either the pressure roller or the field of force creating means in operative position in the impression zone of the drum and said cylinder.

4. In a printing press having a frame and means for feeding a web of print receiving material, the combination of a hollow impression drum rotatably mounted in the frame; a plurality of sub-frame units, said sub-frame units being provided with a gravure cylinder, gravure and offset cylinders, and relief cylinder, respectively; means for interchangeably attaching any one of said sub-frame units to said frame with the respective cylinders in juxtaposed operative position relative to the drum; and means on the interior of the drum for effecting transference of ink from the ink-image-carrying cylinder of a sub-frame unit, to the web on the drum at the impression zone, whereby the press may be adapted for different types of printing.

5. In a printing press having a frame and means for feeding a web of print receiving material, the combination of a hollow impression drum rotatably mounted in the frame; a plurality of sub-frame units, said sub-frame units being provided with a gravure cylinder, gravure and offset cylinders, and relief cylinders, respectively; means for interchangeably attaching any one of said sub-frame units to said frame with their respective cylinders in juxtaposed operative position relative to the drum; and means on the interior of the drum for effecting transference of ink from the ink-image-carrying cylinder of the respective sub-frame unit, to the web on the drum at the impression zone, said last named means comprising a pressure roller and a device for creating a field of force, the latter and the roller being interchangeably positionable at the impression zone, whereby the press may be adapted for different types of printing.

6. In a printing press having a frame and means for feeding a web of print receiving material, the combination of a hollow impression drum rotatably mounted in the frame; an image-carrying cylinder; and means for inking the image on said cylinder comprising an ink supply, and devices for creating a field of force at the surface of the cylinder with the lines of force in a direction to transfer the ink from the supply to the surface of the cylinder.

7. In a printing press, the improvement which comprises a rotatable hollow image-carrying cylinder; an inking device which includes means for temporarily retaining ink deposited thereon in spaced relation to but closely adjacent the surface of the cylinder; and means within the cylinder positioned closely adjacent the temporary ink retaining means, for creating a field of force at the transfer zone with the lines of force acting toward the surface of the cylinder.

8. The improvement in the process of printing which includes: maintaining a supply of ink closely adjacent to but spaced from the surface of a rotatable image-carrying cylinder and progressively transferring the ink to the image area of the cylinder as the latter is rotated, by an induced field of force at the zone of transfer.

9. In a printing press, the improvement which comprises: a rotatable hollow image-carrying cylinder; a comb arranged parallel to the axis of the cylinder and with the termini of the teeth of the comb disposed closely adjacent the surface of the cylinder; means for depositing ink on the teeth of the comb, and means for inducing a field of force with the lines of force directed toward the interior of the cylinder in the zone between the termini of the comb teeth and surface of the cylinder.

10. The improvement in the process of printing which includes: depositing a supply of ink on the teeth of a comb disposed adjacent the surface of a rotatable image-carrying cylinder; and progressively discharging the ink from the comb to the surface of the cylinder, as the latter is rotated, by inducing a field of force in the zone between the comb and the cylinder.

11. The improvement in a printing press which includes: a rotatable hollow drum; a support within the drum; a series of magnets having an armature plate extending lengthwise of the drum and with the free edge of the plate disposed closely adjacent the interior surface of the drum; and an electrostatic comb also mounted on said support and having the termini of the teeth thereof disposed closely adjacent the interior surface of the drum and in close proximity to said edge of the armature plate, whereby by inducing a field of force at the surface of the drum adjacent the termini of said comb teeth and edge of the armature plate, ink may be transferred from an adjacent member to the surface of the drum.

12. In a multicolor printing press having a frame and means for feeding a web of print receiving material, the combination of a hollow impression drum rotatably mounted in the frame; a plurality of rotatable ink-image-carrying cylinders mounted on the frame and circumferentially spaced around and cooperable with the drum; a plurality of pressure-creating means corresponding in number to said cylinders and disposed within and cooperable with the drum; a plurality of means, corresponding in number to said cylinders and disposed within the drum, for creating fields of force at the surface of the drum; and means for selectively positioning either all of the pressure creating means or all of the fields of force creating means in operative positions relative to the several impression zones of the drum and respective ink-image-carrying cylinders.

13. In a multicolor printing press having a frame and means for feeding a web of print receiving material, the combination of a hollow impression drum rotatably mounted in the frame; a plurality of sets of different character printing units; means for interchangeably attaching any set of said units to said frame with the units of the set circumferentially spaced around and in cooperative relation with the drum; and means within the drum for effecting transfer of ink images from each of the several units of a set to said web of material at the respective impression zones of the drum and units, whereby the press may be interchangeably adapted for multicolor printing with different types of printing.

14. In a multicolor printing press having a frame and means for feeding a web of print receiving material, the combination of a hollow impression drum rotatably mounted in the frame; a plurality of ink-image-carrying cylinders rotatably mounted on the frame and circumferentially spaced around and cooperable with the drum; a plurality of pressure rollers disposed within the drum and cooperable therewith, the number of said rollers corresponding to the number of said cylinders; a plurality of means within the drum for creating fields of force at the surface of the drum, said means corresponding in number to the number of said cylinders; and supporting means on which said pressure rollers and fields of force creating means are mounted, said supporting means being angularly adjustable within the drum to thereby selectively position either all of the rollers or all of the fields of force creating means in operative positions relative to the several impression zones of the drum and respective cylinders.

15. In a printing press having a frame, the combination of a movable image carrying member having image portions freely permeable to lines of force and non-image portions substantially impermeable thereto, and means for inking the image portions of said member comprising an ink supply on one side of said member and means operatively associated with the other side of said member for creating a field of force such that the lines of force thereof pass freely through the permeable image portions of said member in a direction to transfer the ink from the supply to the surface of said permeable image portions of said member but are substantially intercepted by the impermeable non-image portions of said member and hence transfer no ink to said impermeable non-image portions.

16. In a printing press the improvement which comprises a rotatable hollow cylinder having image portions freely permeable to lines of force and non-image portions substantially impermeable thereto; an inking device extending the axial length of said cylinder and including means for temporarily retaining ink deposited thereon in spaced relation to but closely adjacent the surface of the cylinder; and means within the cylinder positioned closely adjacent the temporary ink retaining means for creating an electro field of force at the transfer zone such that the lines of force pass freely through the permeable image portions of said cylinder but are substantially intercepted by the impermeable non-image portions thereof and with those lines of force which pass through said cylinder acting in a direction to transfer ink from said ink retaining means to the surface of the permeable image portions of said cylinder while the substantially intercepted lines of force transfer no ink to the impermeable non-image portions.

17. In a printing press having a frame, a movable printing member having image portions freely permeable to lines of force and non-image portions substantially impermeable thereto, means for inking the image portions of said member comprising an ink supply and means for creating a field of force at the surface of the member such that the lines of force pass freely through the permeable image portions of said member in a direction to transfer the ink from the supply to the surface of the image portions of said member but are substantially intercepted by the impermeable non-image portions of said member and hence no ink is deposited on said non-image portions, an impression or supporting member operatively associated with said image carrying member, means for feeding a print receiving material between said members and in timed relation to the movement of said image carrying member, and means for transferring the ink from the inked image portions of said image carrying member to the surface of the print receiving material and comprising means operatively associated with said impression or supporting member for creating a field of force such that the lines of force thereof pass freely through the permeable portions of the image carrying member and through the print receiving material and the impression or supporting member in a direction to transfer the ink from the inked image portions of the image carrying member to the print receiving material.

18. In a printing apparatus, a member forming part of a printing couple, means operatively associated with said member for creating an electromagnetic field of force with the lines of force extending through said member and including a support operatively associated with said member on one side thereof, a series of electromagnets having an armature plate extending lengthwise of said member with the free edge of the plate disposed closely adjacent a surface of the member, and means adjacent the opposite surface of said member in proximity to the free edge of said armature plate and adapted to have ink on its surface adjacent to said member whereby said electromagnetic field of force will act to impel ink from said means towards said member.

19. In a printing apparatus, a member forming part of a printing couple, means operatively associated with said member for creating electro fields of force with the lines of force extending through said member and including a support operatively associated with said member on one side thereof, a series of electromagnets having an armature plate extending lengthwise of said member with the free edge of the plate disposed closely adjacent a surface of the member and capable of creating a magnetic field of force with the lines of force thereof passing through said member, an electrostatic element mounted on said support and having its free edge disposed closely adjacent to said surface of said member and in close proximity to said free edge of the armature plate, and means adjacent the opposite surface of said member in proximity to and cooperating with the free edge of said element to induce an electro field of force extending through said member with the lines of force extending in a direction to impel ink from said last named means toward said opposite surface of said member whereby ink may be impelled from said last named means toward said member by the magnetic field of force, by the induced field of force or by both fields of force.

20. In a printing apparatus, a cylinder forming part of a printing couple, means operatively associated with said cylinder for creating an electro field of force with the lines of force extending through said cylinder and including a support located within said cylinder, an electrostatic element mounted on said support and having its free edge disposed closely adjacent the interior surface of said cylinder, and ink carrying means operatively associated with said cylinder exteriorly thereof and cooperating with said element to create said induced electro field of force with the lines of force extending in a direction to impel ink from said last named means toward the exterior surface of said cylinder.

21. The herein described improvement in the art of producing a predetermined printed design upon a surface of print receiving material and which comprises moving an image carrying member relative to an ink supply discharging element, creating an electro field of force extending from said element through said member and simultaneously causing certain predetermined lines of force of said field of force to deposit ink directly on the image areas of said member while substantially intercepting the remaining lines of force of said field of force to render the same ineffective and thus to cause no ink to be deposited on the non-image areas of said member, transferring the ink from the inked image areas of said member to a surface of print receiving material moving relative to said member by creating a second electro field of force extending from said member through said print receiving material and simultaneously causing certain predetermined lines of force of said second field of force to deposit ink directly on said surface of the material in areas corresponding to the image areas of said member while substantially intercepting the remaining lines of force of said second field of force.

WILLIAM C. HUEBNER.

REFERENCES CITED

The following references are of record in the file of this patent:

FOREIGN PATENTS

| Number | Country | Date |
|---|---|---|
| 214,669 | Great Britain | Apr. 28, 1924 |